United States Patent [19]

Christensson

[11] 4,085,649
[45] Apr. 25, 1978

[54] BOLT ASSEMBLY

[75] Inventor: Nils Artur Christensson, Hamburg, Germany

[73] Assignee: Chris-Marin I Malmo AB, Malmo, Sweden

[21] Appl. No.: 763,986

[22] Filed: Jan. 31, 1977

[30] Foreign Application Priority Data

Feb. 5, 1976 Sweden .............................. 7601236

[51] Int. Cl.² .............................................. F16B 35/00
[52] U.S. Cl. .......................................... 85/1 T; 29/446
[58] Field of Search .................... 85/1 T, 32 T, 32 R; 29/446, 452

[56] References Cited

U.S. PATENT DOCUMENTS 3,130,628  4/1964  Blinn ...................................... 85/1 T

FOREIGN PATENT DOCUMENTS 2,231,381  1/1974  Germany .............................. 85/1 T
2,364,543  7/1974  Germany .............................. 85/1 T
1,014,479  12/1965  United Kingdom .................. 85/1 T Primary Examiner—Ramon S. Britts
Attorney, Agent, or Firm—Blair & Brown

[57] ABSTRACT

The disclosure relates to an arrangement of bolt assemblies for connecting one element with another element, the bolt assembly comprising several bolt and hydraulic nut units which each consist of an outer nut and an inner nut which is exteriorly threaded for engagement with the outer nut and is interiorly threaded for engagement with the threads on the bolt, and of a hydraulic component comprising an annular cylinder and an annular piston, the hydraulic component being intended to be placed about the bolt between the nuts and one of the elements, possibly with an interjacent member placed between the element and the hydraulic component, and by means of which hydraulic unit, the bolt can be stretched via one of the nuts for permitting mounting of the other of the nuts in abutment against the hydraulic component which then serves as a form of washer between the nut and the element. The hydraulic components in adjacent hydraulic nut units are disposed substantially mechanically independently of each other for placing of each respective bolt in abutment against one of those elements which are to be connected to each other, or against a spacer element mounted between this element and the hydraulic component. Moreover, this element and the cylinder of each hydraulic unit is provided with communication passages which discharge at surfaces adjacent each other in this placing of the hydraulic component so that the passages are connected to each other by means of this placing.

5 Claims, 3 Drawing Figures

BOLT ASSEMBLY

BACKGROUND OF THE INVENTION

The present invention relates to a bolt assembly of the type which comprises a plurality of bolts and hydraulic nut units intended for the connection of two elements to each other. Each of the units consists of an interiorly and exteriorly threaded inner nut for engagement with the threads of the bolt and an outer nut with interior threading for engagement with the exterior threading of the inner nut, and of a hydraulic component consisting of an annular cylinder and an annular piston. The hydraulic component is intended to be placed about the bolt between the nuts and one of the above-mentioned elements. Furthermore, the bolt can be stretched by means of the hydraulic unit by the intermediary of the one nut for abutment of the other nut against the hydraulic unit which, thereafter, serves as a type of washer between the nut and the element. Bolt assemblies can be mounted and loosened without appreciable torque by means of an apparatus of this type.

The object of the present invention is to simplify and further improve bolt assemblies which include a number of hydraulic components which are both hydraulically and mechanically releasably interconnected by means of coupling pieces which are provided with connection passages. The object of the invention is more precisely to realize mechanically and hydraulically releasable coupling without the need of separate coupling pieces between the units.

According to a major aspect of the present invention, the hydraulic components in adjacent hydraulic nut units are disposed substantially mechanically independently of each other for placing on each respective bolt in abutment against one of those elements which are to be connected to each other, or against a spacer element mounted between this element and the hydraulic component. Furthermore, this element and the cylinder of each hydraulic component are provided with connection passages which discharge at surfaces adjacent each other in this placing of the hydraulic component so that the passages are connected to each other by means of the above-mentioned placing.

BRIEF DESCRIPTION OF THE DRAWINGS

The present invention and its aspects will be more readily understood from the following description of the accompanying drawings, and discussion relating thereto.

In the accompanying drawings.

DESCRIPTION OF THE PREFERRED EMBODIMENTS

Figure 1:
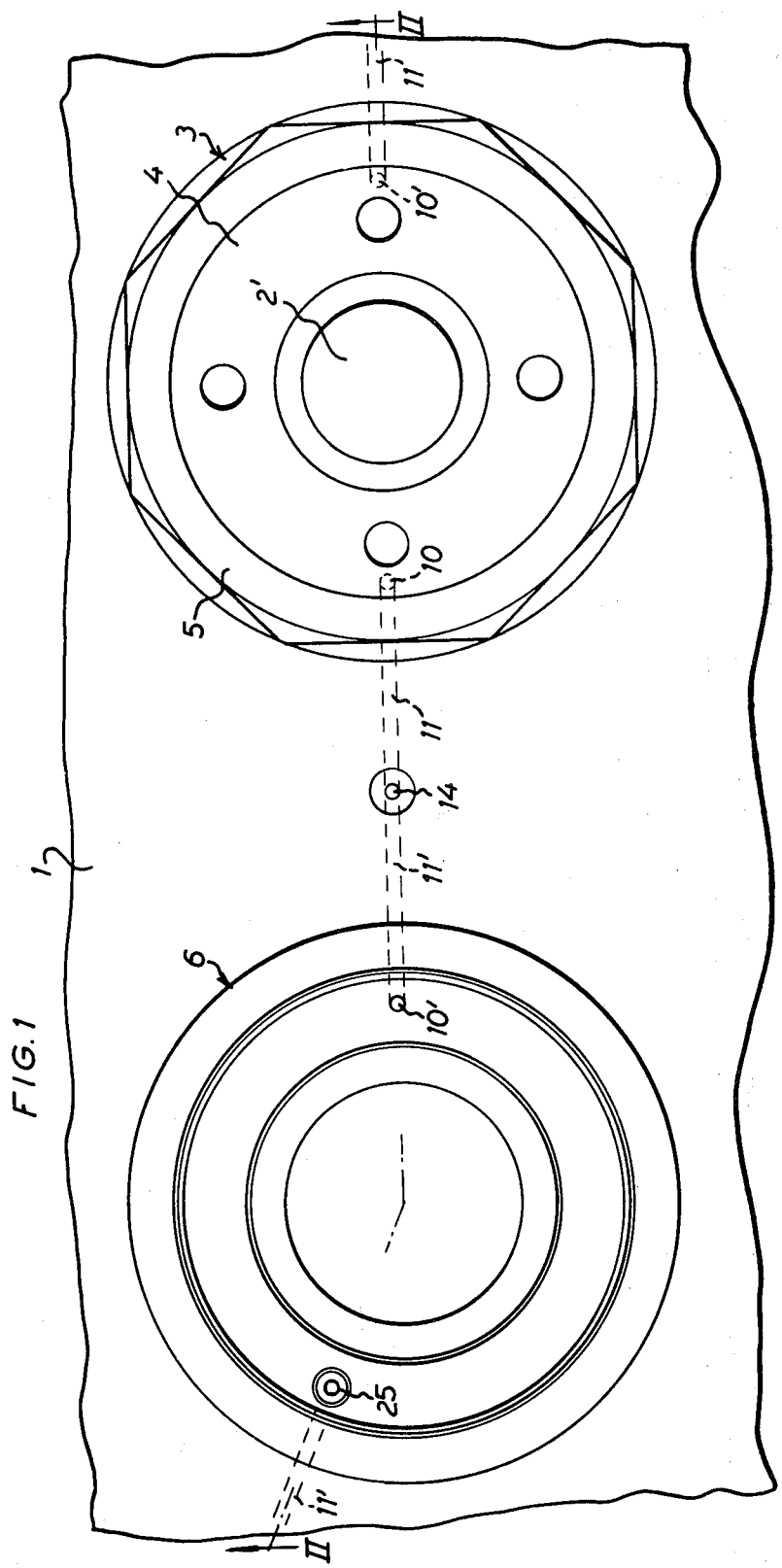
FIG. 1 is a plan view of two hydraulic nut units included in a bolt assembly according to the present invention, of one of these being shown only the annular cylinder.
Figure 2:
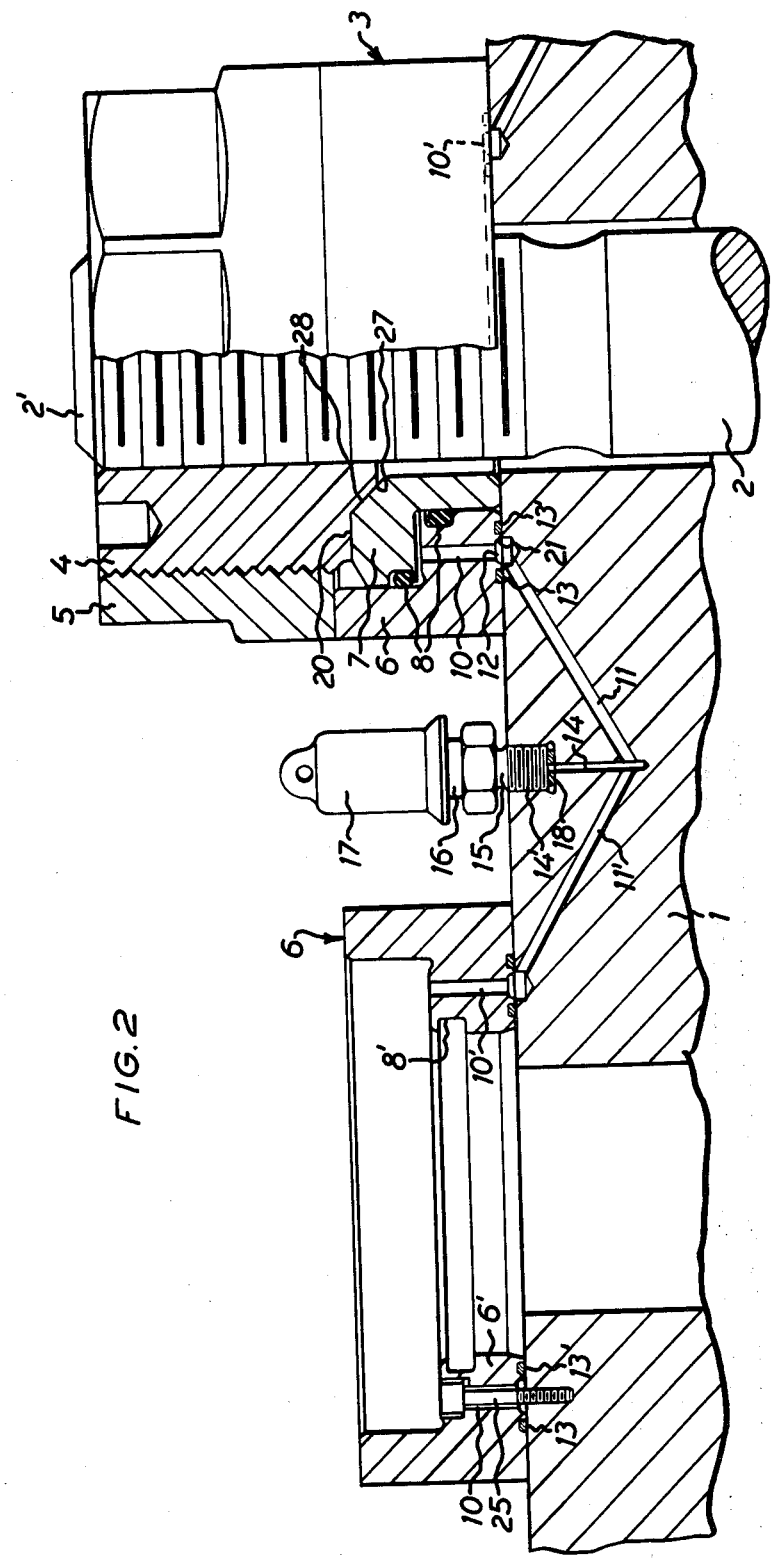
FIG. 2 is a section taken along the line II—II in FIG. 1.

The bolt assembly fragmentarily illustrated in FIGS. 1 and 2 consists of an annular set of bolts and nuts for connection of an element 1 to another element, for example, for connecting the cylinder head of a diesel engine to the cylinder block. To facilitate mounting of the nuts and tightening of the bolts, use is made, for each bolt 2, of an annular hydraulic component generally designated 3 which surrounds the outer threaded end portion 2' of each respective bolt 2 and is mounted between, in this case, a cylinder head 1 which is to be placed in abutment against a cylinder block, and a nut set consisting of two coaxial nuts 4, 5 of which the inner nut 4 is mounted on the threaded end portion 2' of the bolt 2 and has an outer thread for engagement with the outer nut 5 mounted on the inner nut 4. Each hydraulic component 3 consists of an annular cylinder 6 and an annular piston 7 of the design which is apparent from FIGS. 1 and 2. The cylinder 6 consists, thus, of a ring with an inner end flange and the piston 7 consists of a ring with an outer end flange which is accommodated in the cylinder ring 6 with the flanges located adjacent one another. On either side of the adjacent flange surfaces, there are disposed sealing rings 8 between the cylinder and the piston, one sealing ring being mounted in a groove on the outer circumference of the piston; whereas the other sealing ring is mounted in a groove 8' on the inner circumference of the cylinder flange 6' which forms the base of the cylinder (please see the left-hand half of FIG. 2). The gap between the adjacent cylinder and piston flange surfaces is connected, in the region between the sealing rings 8, to two passages 10, 10' drilled through the cylinder wall. In the assembly, each hydraulic component 3 has its cylinder passages 10, 10' connected to the cylinder passages 10, 10' of the adjacent component by the intermediary of passages 11, 11' drilled in the subjacent element 1.

Each hydraulic component 3 may have any desired outer circumference, for example, circular. The passages 10, 10' drilled in the cylinders 6 can extend through the flange or base portion 6' of each respective cylinder (FIGS. 1, 2), so as to discharge in an annular groove 12 provided in the underside of the cylinder between two annular grooves for two sealing rings 13, 13' for sealing each respective cylinder against the element 1 (for example, a cylinder head). However, the groove 12 can be designed with seats for the sealing rings 13, 13', that is to say, such that the grooves for the sealing rings and the groove 12 coincide. In the embodiment in FIGS. 1 and 2, the passages 11, 11' drilled in the element 1 between adjacent cylinders 6 extend obliquely towards each other from the upper side of the element 1 and meet at a point opposite the adjacent cylinders. From the meeting point, there extends a vertical channel 14 to the upper side of the element, where this channel is plugged by means of a stopper 15 which is screwed into a threaded broadening 14' of the channel 14.

The stoppers 15 can include a built-in non-return valve and a connection nipple 16 (please see FIG. 2), on which may be mounted a protective hood 17. For the supply of hydraulic oil to all of the cylinders in a bolt assembly, only one connection nipple 16 in a channel 14 is, in principle required, it being possible to close the remaining channels by means of a screw-stopper 15. These stoppers should be easily removable for replacement, when necessary, by a connection nipple 16. The stoppers 15 can be provided as air ventilation stoppers to permit bleeding of air from the hydraulic circuit. The nipple (or nipples) 16 which have threaded bases, are provided with a sealing surface about the opening of the nipple channel at the end of the nipple base for sealing against a sealing ring 18 at the base set of the channel broadening 14' about the channel 14.

The above-described hydraulic system and hydraulic components of the bolt assembly work in the following manner. When high-pressure oil is supplied to the described channel system by the intermediary of a nipple 16, all of the cylinders 6 are fed simultaneously. As a result, the piston 7 in each cylinder 6 is forced in an upward direction and thereby extends through each respective bolt 2 via the inner nut 4. The outer nut 5 which is tightened to abutment against the cylinder 6 is entrained by and accompanies the inner nut and a gap is formed between the cylinder block and the outer nut 5. The outer nut 5 is then screwed into abutment against the cylinder block and when the hydraulic pressure has been caused to cease, the outer nut 5 is maintained pressed against the cylinder block with a force corresponding to the tightening force of the bolt. The inner nut 4 can then be screwed into abutment against the piston 7 with a light abutment pressure.

The units of the bolt assembly can, in a very simple manner, be arranged such that a mechanical connection of the hydraulic nut units by means of the coupling pieces to one assembly united by them will be unnecessary. The necessary working operations for hydraulic connection of the units to each other to form a closed circuit has been reduced to a minimum and, because of the fact that the hydraulic circuit allows for rapid isolation of each hydraulic component, the remaining hydraulic components can be maintained in functional condition should any of the hydraulic units be damaged. Consequently, replacement can be carried out very rapidly and with a minimum of inconvenience.

Thus, in the apparatus according to the present invention, the separate hydraulic nut units are mechanically independent of each other and their cylinder passages 10, 11' are disposed for direct connection to the passages in subjacent material. It should be particularly observed that the pressure fluid supplied to each cylinder 6 through a passage 11 or 11' acts in the cylinder 6 on a pressure surface 20 which is greater than the annular surface 21, subjected to hydraulic pressure, between both of the sealing rings 13, 13' at the inner side and outer side, respectively of the annular groove 12. This arrangement ensures that the cylinders 6, by the initial pressure on supply of hydraulic oil, are rapidly urged into tight abutment against the element 1 so as to prevent leakage of hydraulic oil between the element 1 and the cylinder 6.

The damage which most commonly occurs to a hydraulic nut unit is surface damage to the cylinder 6 (the piston 7 is more seldom damaged), and a great advantage inherent in the assembly according to the invention is that, in the event of such damage, it is easy to replace the cylinder 6, since the dismantling work for replacement concerns only the hydraulic nut unit which has been damaged. In the assembly according to the present invention, each cylinder unit is placed directly on the element 1. Thus, assembly and dismantling can be carried out without the need of assembly or dismantling of any mechanical or hydraulic coupling.

Figure 3:
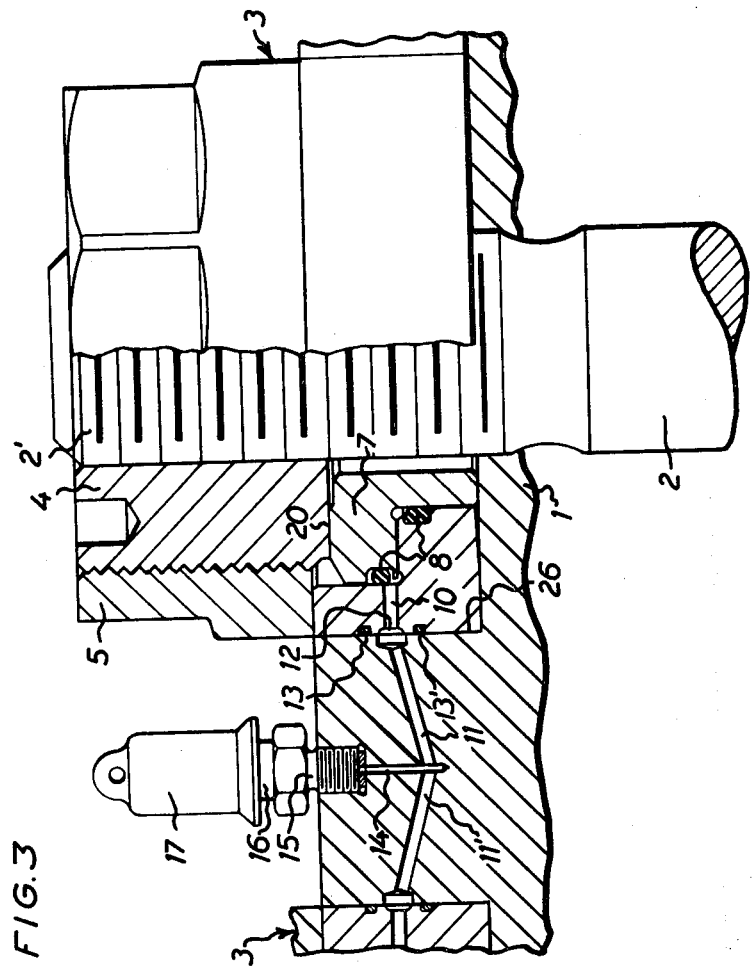
FIG. 3 is a similar view to FIG. 2 but shows a modification according to the invention.

FIG. 3 shows that the hydraulic components 3 can be placed countersunk in cylindrical recesses 26 in the element 1 and that the passages 10, 10' in each cylinder 6 can discharge into a groove 12' on the circumferential surface of each respective cylinder for connection to corresponding passages 11, 11' drilled in tha element 1. These passages 11, 11' discharge, in this case, at the circumference of each respective recess 26. The embodiment of FIG. 3 may be used if there is room in the element 1 for countersunk mounting of the hydraulic components 3, but the embodiment in FIGS. 1 and 2 must be considered as better than that of FIG. 3 because the sealing between the cylinder units and the element 1 is improved by the axial abutment pressure of the cylinders against the element 1. However, both of the embodiments will give the above-described advantage that the hydraulic components are independent of mutual mechanical connection and are connected hydraulically without special assembly work quite simply by mounting each respective hydraulic unit in place, the annular groove 12 or 12' thereof being automatically connected to the passages 11, 11' in subjacent material.

Mention has been made above that the element 1 is one of those elements which are to be connected to each other, but the element 1 could also be a spacer between each respective hydraulic component 3 and one of those elements which are to be connected to each other. The essential feature of the invention is that each hydraulic unit can be placed, without mechanic connection to adjacent hydraulic units, directly on a subjacent element (or, in the manner shown in FIG. 3, in a cavity in a subjacent element) for hydraulic connection without time-consuming and difficult connection operations.

In FIG. 2 is shown a further advantage which is obtained by the apparatus according to the present invention.

If, in an assembly according to the invention, the piston 7 of a hydraulic component 3 is not correctly centered in relation to the corresponding bolt 2, the bolt can be exposed to bending stresses when the hydraulic component 3 is placed under pressure. It may then consequently be impossible to place the nuts 4, 5 in position for the desired tightening force. However, in the assembly according to the present invention, each hydraulic component 3 can be shifted somewhat in relation to each respective bolt 2 without disrupting the hydraulic communication between the passages 10, 10' and 11, 11'. The reason for this is that the annular groove 12 may be of sufficient width to allow for a minor shifting of the cylinder 6. Consequently, centering surfaces 27, 28 can, for the purposes of centering the hydraulic component 3 relative to the bolt 2, be provided for co-operation with each other on the inner nut 4 and on the piston 7, respectively. The hydraulic component 3 can, thereby, be easily centered in relation to the bolt 2 by means of the inner nut 4.

In the embodiment in FIG. 3, such a centering operation is more difficult to carry out because of the location of the annular groove 12' on the circumference of the cylinder 6, the assembly according to FIG. 2 being preferred also for this reason.

What I claim and desire to secure by Letters Patent is:

1. A hydraulic tensioning means for fastening a first element to a second element with uniform pressure comprising, a single hydraulic nipple inlet disposed on said first element, a plurality of passageways eminating from said nipple within said first element serially connecting a plurality of bolt assemblies, said bolt assemblies including a bolt fastened to said second element extending through and out of said first element having a threaded portion disposed outwardly of said first element, an inner nut having inner and outer threads thereon fastened to said threaded portion of said bolt, an outer nut threaded on the outer threads of said inner nut, a cylinder underlying said outer nut and substantially adjacent to said first element and a piston disposed within said cylinder which underlies said inner nut and surrounds said bolt, said piston having a portion thereon which communicates with said passageways whereby hydraulic pressure within said passageways causes said piston to tension by stretching said bolt through each of said inner nuts, and said pressure simultaneously causes said outer nuts to raise therewith and the tension can therefore be adjusted by tightening said outer nut on said cylinder, releasing said pressure and turning down said inner nut.

2. The arrangement as recited in claim 1, wherein the passages in the cylinder of each hydraulic component discharge in a common annular groove on one end surface of the cylinder which is intended to be placed against a surface of said element so that the passages of said element discharge in said annular groove.

3. The arrangement as recited in claim 1, in which each hydraulic component is intended to be placed countersunk in a recess in said element, wherein the passages in the cylinder of said hydraulic unit discharge in an annular groove on a portion of the circumference of said cylinder, which portion is disposed to be accommodated in said recess, and wherein corresponding passages in said element discharge in the circumference of said recess.

4. The arrangement as recited in claim 2, wherein a sealing ring is applied on either side of said annular groove.

5. The arrangement as recited in claim 1, wherein the piston and inner nut of each hydraulic component are provided with guide surfaces which are designed to co-operate with each other for centering of said hydraulic component relative to its corresponding bolt, and wherein said annular groove or the openings of said cylinder passages and/or the passages of said element are of sufficient width to permit communication between the passages also in the event of a minor lateral shift of the hydraulic component for centering relative to said bolt.

* * * * *